United States Patent
Wilkerson et al.

(10) Patent No.: US 7,096,740 B2
(45) Date of Patent: Aug. 29, 2006

(54) REUSABLE PRELOAD INDICATING WASHER ASSEMBLY

(75) Inventors: Jeffrey A. Wilkerson, Bothell, WA (US); John R. Porter, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 10/991,639

(22) Filed: Nov. 17, 2004

(65) Prior Publication Data
US 2006/0107751 A1    May 25, 2006

(51) Int. Cl.
F16B 31/02    (2006.01)
(52) U.S. Cl. ....................................................... 73/761
(58) Field of Classification Search ................... 73/761
See application file for complete search history.

(56) References Cited

U.S. PATENT DOCUMENTS 4,046,014 A * 9/1977 Boehringer et al. ..... 73/863.12
4,333,220 A * 6/1982 Aspers ..................... 29/407.02
4,773,272 A * 9/1988 Trungold ..................... 73/761

OTHER PUBLICATIONS

SPS Technologies Aerospace Fasteners Group, "Preload Indicating Washers", brochure, copyright 1999.

* cited by examiner

Primary Examiner—Edward Lefkowitz
Assistant Examiner—George P Bonanto
(74) Attorney, Agent, or Firm—Thomas F. Lebens; Fitch, Even, Tabin & Flannery

(57) ABSTRACT

A preload indicating washer assembly that operates in the elastic region for a rated compression is disclosed. Because it operates in the elastic region, the preload indicating washer assembly resumes its original shape when the compression is decreased or removed. The washer assembly elastically deforms again to the same extent as its original deformation when the predetermined compression is restored. Thus the washer assembly will indicate the proper fastener preload when used for multiple loading cycles or in multiple locations.

19 Claims, 2 Drawing Sheets

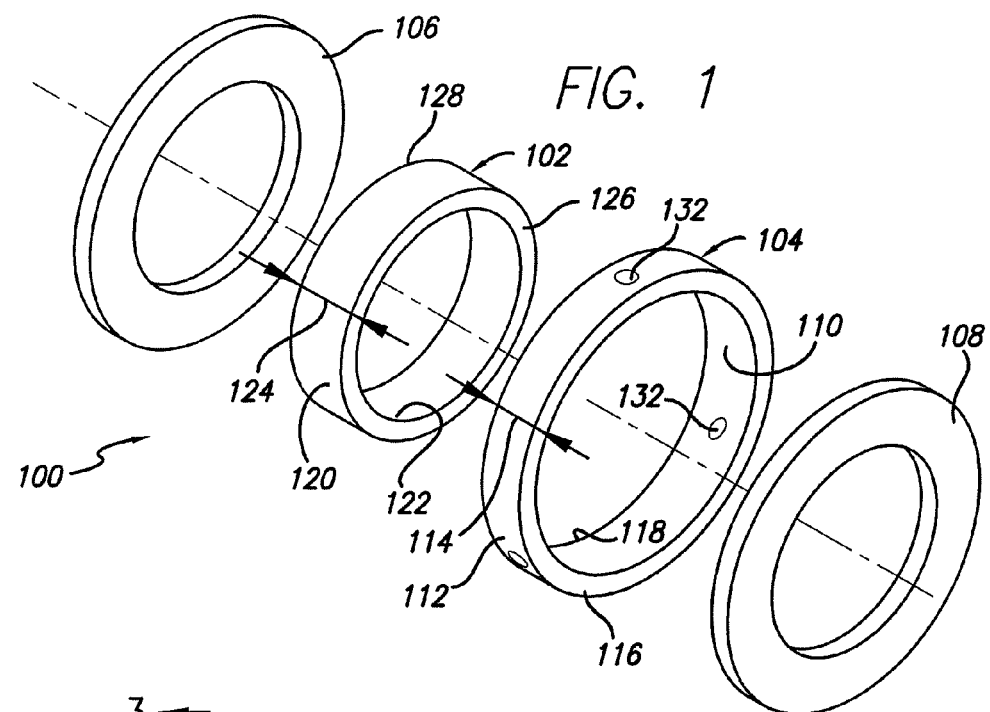
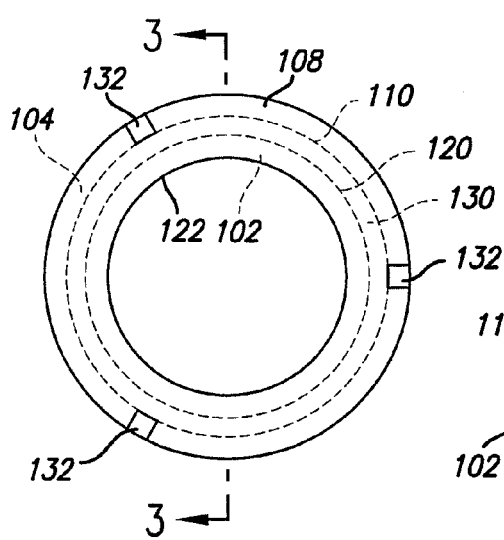
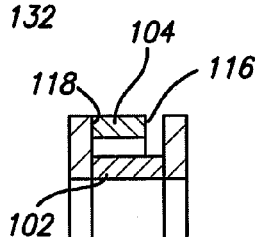
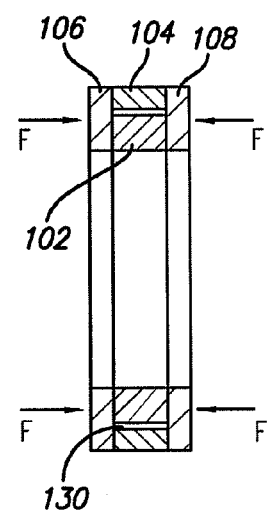

REUSABLE PRELOAD INDICATING WASHER ASSEMBLY

1. Field of the Invention

This invention relates to fastening devices, and more particularly, to preload indicating washer assemblies that may be used in connection with bolts and nuts, with externally threaded studs, or with other fasteners, shafts, axles or rods.

2. Background

Preload indicting washer assemblies are used with fastening devices such as, for example, nuts and bolts, for critical applications where it is important to know a predetermined compression value applied by the fastening devices or an axial tension in a bolt, rod, etc. Examples of important applications for such assemblies may include the fastening of certain critical joints of aircraft, etc.

The use of torque wrenches do not always provide consistent indications of the compression or load actually applied by the fasteners. That is, even when the same torque (as read by a torque wrench) is applied to a plurality of fasteners of the same fastener type and size, differing preloads are actually experienced on the fasteners due to tolerance variations in the manufacture of the fasteners, including small variations in fastener dimensions, materials and coatings, as well as variations in any lubrication that may be applied. It is believed that under some circumstances, the application of the same torque as read by a torque wrench to a plurality of bolts supplied under the same part number, can result in a variation of 25% or more in the load actually applied by the bolts. Thus preload indicating washer assemblies can be used with application-critical fasteners to provide a more accurate indication of the actual compression applied by the fasteners on their associated joints. Additionally, these assemblies can be used to provide an indication of compression in joint locations that are not accessible by torque wrenches.

Known preload indicating washer assemblies function by a plastic deformation of an inner ring member to "indicate" when the proper bolt load is reached. That is, the inner ring member is concentrically mated with an outer ring member having a shorter axial height than the inner ring member. The inner and outer ring members are sandwiched between two, standard washers. This assembly is mated with a bolt or other fastener so that the shorter, outer ring member can be made to manually rotate around both the taller inner ring member as well as the fastener when no compression, or when a compression below the rated load, is applied.

In operation, the inner ring member is subjected to compression applied by the fastener, such as a bolt, as two or more components of a structure are being assembled. When the desired, predetermined compression is reached, the inner ring member is plastically deformed so that the two standard washers abut each end of the outer ring member with sufficient force that the outer ring member is no longer able to rotate around the inner member or the fastener. Thus by manually attempting to rotate the outer ring member from time to time as increasing compression is applied, the user can know that the desired, predetermined compression has been reached when the outer ring member can no longer be manually rotated.

Because the deformation of the inner rings of known, preload indicating washer assemblies is plastic and permanent, these assemblies cannot be reused to indicate proper bolt or fastener loading. Another washer assembly, or at least another inner ring component, must be used. Additionally, if the joint or bolt loses tension due to relaxation etc. of the assembled structure, the act of simply retightening the nut (and thereby re-applying increased compression to the previously-deformed inner ring) will not ensure an adequate joint load.

Thus it is desirable to provide an improved preload indicating washer assembly that is repeatable, i.e. that can be reused and/or re-tightened while retaining the ability to accurately indicate the design or rated compression experienced by it.

SUMMARY OF THE ILLUSTRATED EMBODIMENTS

One embodiment of the present invention provides an improved preload indicating washer assembly designed to operate in the elastic region for the rated, predetermined compression that is desired. Because it operates in the elastic region, the preload indicating washer assembly resumes its original shape when the compression is decreased or removed.

In one aspect, an apparatus is for use with a first member and for use in indicating a compression of a predetermined value. The first member has a first member inner surface that defines a first member aperture adapted to receive a bolt extension or other elongated member. The first member further has a first member axial height.

A second member has a second member inner surface defining a second member aperture that is adapted to receive the elongated member. The second member further has a second member outer surface and a second member axial height that is greater than the first member axial height.

At least a portion of the second member is adapted to fit within the first member aperture so that the first member inner surface is adjacent to a portion of the second member outer surface when the second member is under no compression. The first member is adapted for at least partial rotation around the elongated member and the second member when the first member inner surface is adjacent to the second member outer surface and when the second member is under no compression. The second member is constructed of a material that is adapted to deform elastically when the second member is compressed by a force equal to the predetermined value.

In another aspect, the first member further has a first member outer surface and a lug extending from the first member outer surface.

In yet another aspect, the apparatus is further for use with an actuator and the first member further has a first member outer surface defining a bore adapted to receive the actuator.

In another aspect, the apparatus is further for use with a third member that has a third member aperture and is adapted to mate with the elongated member. The apparatus is further for use with a fourth member that has a fourth member aperture and is adapted to mate with the elongated member. The second member has a proximate side and a distal side, each of which connects the second member inner surface with the second member outer surface.

The third member is adapted to abut one of the proximate and distal sides of the second member and the fourth member is adapted to abut the other of the proximate and distal sides when the first, second, third and fourth members are mated with the elongated member and when the first member inner surface is adjacent to the portion of the second member outer surface.

There are additional aspects to the present inventions. It should therefore be understood that the preceding is merely a brief summary of some embodiments and aspects of the present inventions. Additional embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

FIG. 1 is an exploded, perspective view of a preload indicating washer assembly according to one embodiment of the present inventions.

FIG. 2 is a top plan view of the washer assembly of FIG. 1.

FIG. 3 is a cross-sectional view of the washer assembly of FIG. 2 without any compression force being applied, as viewed along lines 3—3 of FIG. 2.

FIG. 4 is a cross-sectional view of the washer assembly of FIG. 2 with a compression force applied.

DETAILED DESCRIPTION

Figure 5:
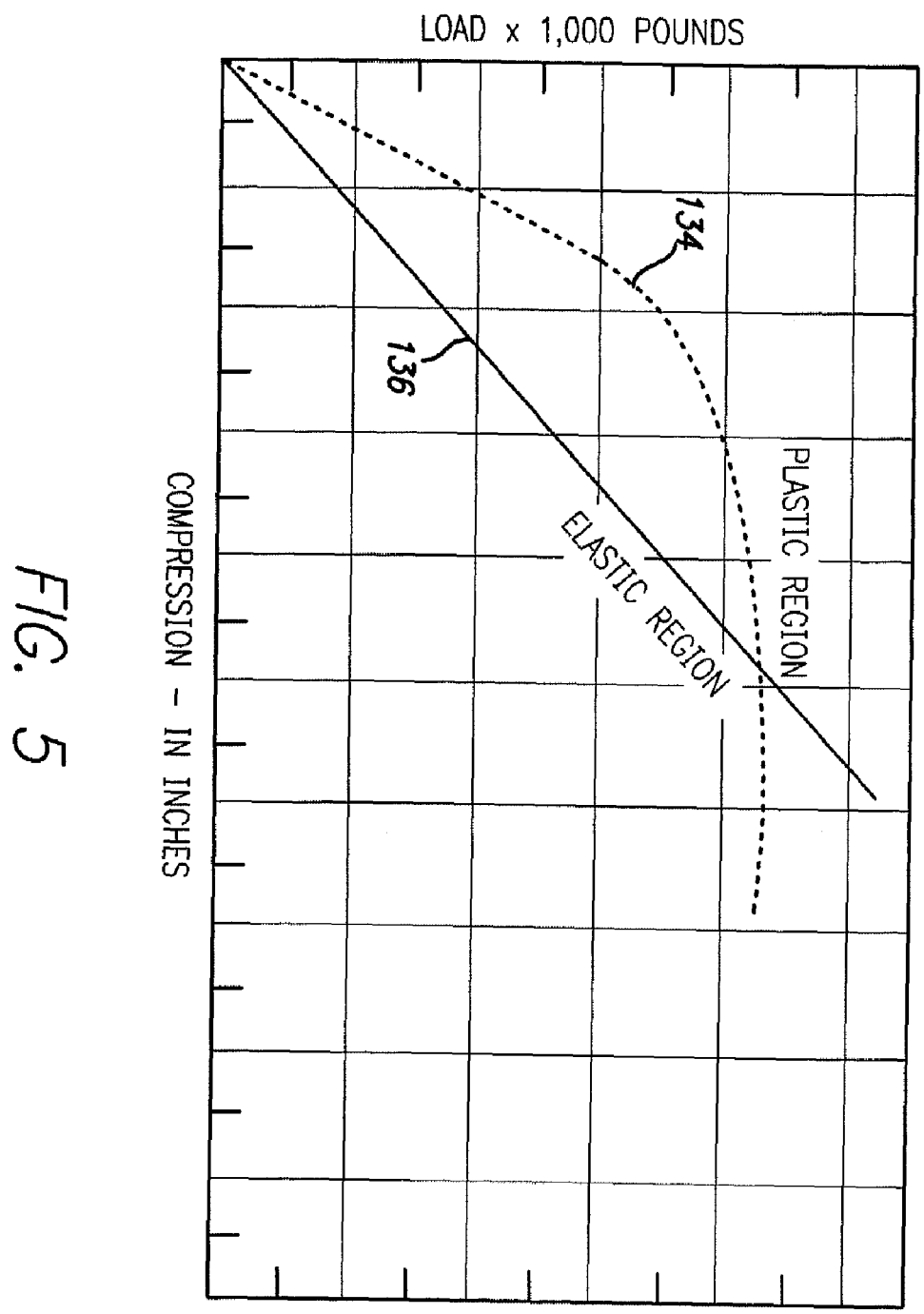
FIG. 5 is a stress-strain diagram of two materials.

In the following description, reference is made to the accompanying drawings which form a part hereof and which illustrate several embodiments of the present invention. It is understood that other embodiments may be utilized and structural and operational changes may be made without departing from the scope of the present invention.

One embodiment of the present invention provides an improved preload indicating washer assembly designed to operate in the elastic region for the rated, predetermined compression that is desired. Because it operates in the elastic region, the preload indicating washer assembly resumes its original shape when the compression is decreased or removed. The washer assembly elastically deforms again to the same extent as its original deformation when the predetermined compression is restored. Thus the washer assembly will indicate the proper fastener preload when used for multiple loading cycles or in multiple locations.

Referring to FIGS. 1–4, there is shown a preload indicating washer assembly 100 comprising an inner ring 102, an outer ring 104, a distal washer 106, and a proximate washer 108. The outer ring 104 has a cylindrically-shaped inner surface 110, a cylindrically-shaped outer surface 112 and an axial height 114. The inner diameter of the outer ring 104 is adapted to mate with a threaded extension of a bolt or with another elongated member (not shown) extending from a fastening apparatus or from any other surface. The outer ring 104 further has a proximate side 116 and a distal side 118 each of which connects the inner surface 110 and outer surface 112.

The inner ring 102 has a cylindrically-shaped outer surface 120, a cylindrically-shaped inner surface 122 and an axial height 124 that is greater than the axial height 114 of the outer ring 104. The inner ring 102 further has a proximate side 126 and a distal side 128, each of which connects the outer surface 120 and inner surface 122. The inner diameter of the inner ring 102 is also adapted to mate with the same bolt extension or other elongated member (not shown) as is used with the outer ring 104.

As best seen in FIGS. 2 and 3, the outer diameter of the inner ring 102 is less than the inner diameter of the outer ring 104 so that the inner and outer rings may be concentrically mated such that the outer ring inner surface 110 surrounds a portion of the inner ring outer surface 120. When the inner and outer rings 102, 104 are concentrically mated, the proximate washer 108 is placed so that it abuts the proximate side 126 of the inner ring 102. Similarly, the distal washer 106 is placed so that it abuts the distal side 128 of the inner ring 102. As so arranged, the assembly 100 is placed on the threaded extension of a bolt or on another elongated member. As best seen in FIG. 3, a first gap 130 is thereby formed between the inner surface 110 of the outer ring 104 and the outer surface 120 of the inner ring 102. Also, a second gap 138 is formed between the proximate washer 108 and the proximate side 116 of the outer ring 104. While the embodiment of FIGS. 1–4 shows the use of inner and outer rings, it will be appreciated that inner and outer members having other shapes and geometries may be used as well.

The outer ring 104 has a plurality of bores 132 extending from the outer surface 112 to the inner surface 110. These bores 132 are adapted to receive a peg or other actuator (not shown). When the assembly 100 is placed on a bolt or other elongated member, the user can insert the peg into one of the bores 132 so as to provide a manual grip for assistance in manually rotating the outer ring 104 around the inner ring 102 and the bolt. As best seen in FIG. 4, when a compression force (represented by the arrows designated by the letter "F") of a predetermined value corresponding to the rated load is placed on the inner ring 102, the inner ring deforms elastically such that any further rotation of the outer ring 104 is prevented or inhibited. This prevention/inhibition of the rotation is caused by the frictional force of the proximate and distal washers 108, 106 acting on the proximate and distal sides 116, 118 of the outer ring as is evident by the disappearance of the second gap 138 (FIG. 3).

In alternative embodiments, however, the inhibition/prevention of the rotation is caused by the deformation of the inner ring outer surface 120 such that it abuts the outer ring inner surface 110 with sufficient frictional force to inhibit or prevent any further rotation of the outer ring 104. Thus in such alternative embodiments, the first gap 130 (FIG. 3) would disappear when the predetermined compression force is applied.

While the embodiment of FIGS. 1–4 shows bores 132 that are used with pegs, it will be appreciated that other designs may be employed to facilitate the rotation of the outer ring 104. For example, the outer ring 104 can include one or more lugs extending from the outer surface 112 for use in gripping the outer ring 104. Alternatively, the outer surface 112 can have a plurality of knurls to assist in gripping the outer ring 104.

The inner ring 102 is constructed of a material that is adapted to deform elastically in the design operating range of the rated, predetermined compression. According to one embodiment of the invention, the inner ring 102 is constructed of nitinol, i.e. a nickel titanium alloy. Exemplary nitinol can be obtained from Nitinol Technologies, Inc., of Auburn, Wash. under the designation "60 Nitinol." However, other embodiments of the invention may be constructed of other materials that deform elastically for the desired, rated compression load.

FIG. 5 is a stress-strain diagram showing force deflection curves for two materials used as inner ring components of preload indicating washer assemblies. The material represented by the dotted line 134 shows the behavior of a material used for known inner ring components. The design or rated compression for the known device is in the plastic region of this curve 134. Thus as can be seen, any removal and subsequent restoration of compression on such a device would not result in a reliable and repeatable deformation of the material for purposes of indicating the actual compression at a joint.

The solid line 136 shows the behavior of a material used according to one embodiment of the invention. In contrast to known preload indicating devices, this material operates in the elastic region for the rated, predetermined compression. Thus any removal and subsequent restoration of compression on a device made of this material results in a reliable change in the deformation for purposes of indicating the amount of applied compression. This therefore provides the desired "repeatability" of a preload indicating device.

It will be appreciated that preload indicating washer assemblies can be designed for different rated or predetermined compression loads by the selection of different materials according to their stress-strain characteristics. Additionally, variations in design loads can be achieved by varying the height or thickness of the inner ring component, or in alternative embodiments of the invention, by varying the width of the gap between the outer surface of the inner ring and the inner surface of the outer ring.

In operation according to some embodiments, the distal washer 106 is placed around a threaded extension of a bolt or other elongated member (not shown). Next, the inner ring 102 and the outer ring 104 are placed around the bolt extension and are aligned concentrically with one another so that the outer ring inner surface 110 surrounds a portion of the inner ring outer surface 120. Then, the proximate washer 108 is placed around the threaded extension so that it abuts the outer ring proximate side 116.

By exerting a torque on a nut engaged with the threaded extension, a first axial compression is applied to the assembly 100, including the inner ring 102. This first compression is less than a predetermined value corresponding to the design or rated compression of the inner ring 102. Using an actuator engaged in one of the bores 132 of the outer ring 104, the outer ring 104 is at least partially rotated around both the inner ring 102 and the threaded extension thus confirming that the design compression has not been reached. Next, a second compression that is less than the rated load is applied to the assembly, including the inner ring 102. The outer ring 104 is again rotated thus again confirming that the design compression has not yet been achieved. This process is continued until the compression experienced by the inner ring 102 reaches the predetermined, rated compression value. At this point, the inner ring 102 will elastically deform such that the proximate washer 108 abuts the proximate side 116 of the outer ring 104, and the distal washer 106 abuts the distal side 118 of the outer ring 104 with sufficient force to inhibit rotation of the outer ring 104. (Or in alternative embodiments, the inner ring 102 will elastically deform such that the inner ring outer surface 120 abuts the outer ring inner surface 110 with sufficient force to inhibit the rotation of the outer ring 104.) At this point, when the actuator is used in an attempt to rotate the outer ring 104, it will be observed that the outer ring 104 cannot rotate thus indicating that the rated compression as experienced by the inner ring 102, the fastener and the joint has been reached.

A some later time, the compression on the assembly 100 is reduced from the predetermined, rated load to a lower, second value, either intentionally or due to relaxation of the joint. The outer ring 104 is rotated thus confirming that the rated load is no longer present at the bolt. Next, a compression in the amount of the rated load is again applied to the assembly 100 and the inner ring 102. Once again the inner ring 102 elastically deforms as previously described so as to inhibit the rotation of the outer ring 104.

At yet another time, the compression on the assembly 100 is removed entirely, the nut is disengaged from the bolt and the assembly 100 is removed. This same assembly 100 is then reassembled on the original members or placed on another bolt or other type of fastener, and the above process is repeated.

Thus there is disclosed an improved preload indicating washer assembly that operates in the elastic region for the rated, predetermined compression that is desired. Because it operates in the elastic region, the preload indicating washer assembly resumes its original shape when the compression is decreased or removed. The washer assembly elastically deforms again to the same extent as its original deformation when the predetermined compression is restored. Thus the washer assembly will indicate the proper fastener preload when used for multiple loading cycles or in multiple locations.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. An apparatus for use with a first member and for use in indicating a first compression of a predetermined value and a second compression of the predetermined value, said first member having a first member inner surface defining a first member aperture adapted to receive an elongated member, said first member further having a first member axial height, said apparatus comprising:
   a second member having a second member inner surface defining a second member aperture adapted to receive the elongated member, said second member further having a second member outer surface and a second member axial height that is greater than the first member axial height;
   wherein at least a portion of said second member is adapted to fit within the first member aperture so that at least a portion of the first member inner surface is adjacent to at least a portion of the second member outer surface when the second member is under no compression;
   wherein the first member is adapted for at least partial rotation around the elongated member and the second member when the at least a portion of the first member inner surface is adjacent to the at least a portion of the second member outer surface and when the second member is under no compression;
   wherein the second member is constructed of a material that is adapted to deform elastically when the second member is compressed by a force equal to the predetermined value, and wherein the apparatus reuseable for indicating the second compression of the predetermined value.

2. The apparatus of claim 1 wherein the second member is constructed of nitinol.

3. The apparatus of claim 1 wherein the first member further has a first member outer surface and a lug extending from the first member outer surface.

4. The apparatus of claim 1 wherein the apparatus is further for use with an actuator and wherein the first member further has a first member outer surface defining a bore adapted to receive the actuator.

5. The apparatus of claim 1 wherein the first member further has a first member outer surface having a plurality of knurls.

6. The apparatus of claim 1, wherein the apparatus is further for use with a third member defining a third member aperture and adapted to mate with the elongated member, and for use with a fourth member defining a fourth member aperture and adapted to mate with the elongated member,
    wherein the second member has a proximate side and a distal side, each of said proximate and distal sides connecting the second member inner surface with the second member outer surface, and
    wherein the third member is adapted to abut one of the second member proximate and distal sides and the fourth member is adapted to abut the other of the second member proximate and distal sides when the first and second members are mated with the elongated member, when the at least a portion of the first member inner surface is adjacent to the at least a portion of the second member outer surface, and when the second member is compressed by the force equal to the predetermined value.

7. An apparatus for use with a generally ring-shaped first member and for use in indicating a first compression of a predetermined value and a second compression of the predetermined value, said generally ring-shaped first member having a generally cylindrically-shaped first member inner surface defined by a first member inner diameter and being adapted to mate with an elongated member, said first member further having a first member axial height, said apparatus comprising:
    a generally ring-shaped second member having a generally cylindrically-shaped second member outer surface defined by a second member outer diameter that is less than the first member inner diameter when the second member is under no compression, said second member being adapted to mate with the elongated member and having a second member axial height that is greater than the first member axial height;
    wherein at least a portion of the first member inner surface is adapted to surround at least a portion of the second member outer surface when the second member is under no compression;
    wherein the first member is adapted for at least partial rotation around the elongated member and the second member when the at least a portion of the first member inner surface surrounds the at least a portion of the second member outer surface and when the second member is under no compression;
    wherein the second member is constructed of a material that is adapted to deform elastically when the second member is compressed by a force equal to the predetermined value, and wherein the apparatus reusable for indicating the second compression of the predetermined value.

8. The apparatus of claim 7 wherein the second member is constructed of nitinol.

9. The apparatus of claim 7 wherein the first member further has a first member outer surface and a lug extending from the first member outer surface.

10. The apparatus of claim 7 wherein the apparatus is further for use with an actuator and wherein the first member further has a first member outer surface defining a bore adapted to receive the actuator.

11. The apparatus of claim 7 wherein the first member further has a first member outer surface having a plurality of knurls.

12. The apparatus of claim 7, wherein the apparatus is further for use with a third member defining a third member aperture and adapted to mate with the elongated member, and for use with a fourth member defining a fourth member aperture and adapted to mate with the elongated member,
    wherein the second member has a second member inner surface, and wherein the second member further has a proximate side and a distal side, each of said proximate and distal sides connecting the second member inner surface with the second member outer surface, and
    wherein the third member is adapted to abut one of the second member proximate and distal sides and the fourth member is adapted to abut the other of the second member proximate and distal sides when the first and second members are mated with the elongated member, when the at least a portion of the first member inner surface is adjacent to the at least a portion of the second member outer surface, and when the second member is compressed by the force equal to the predetermined value.

13. The apparatus of claim 12 wherein the first and second members are rings, wherein the third and fourth members are washers, and wherein the elongated member is one of a bolt and an externally-threaded stud.

14. A method of applying a compression of a predetermined value using a generally ring-shaped first member having a generally cylindrically-shaped inner surface, and using a generally ring-shaped second member having a generally cylindrically-shaped outer surface, said second member being constructed of a material that is adapted to deform elastically but not plastically when compressed by a force equal to the predetermined value, the method comprising the steps of:
    mating the first and second members with an elongated member so that at least a portion of the first member inner surface surrounds at least a portion of the second member outer surface;
    applying a first compression on the second member, said first compression being of a first value that is less than the predetermined value;
    rotating the first member at least partially around the elongated member when the second member is under the first compression; and
    applying a second compression on the second member, said second compression being of the predetermined value, thereby causing an elastic but not plastic deformation of the second member; and
    applying a rotational force on the first member.

15. The method of claim 14 further comprising the steps of:
    reducing the second compression on the second member from the predetermined value to a second value;
    rotating the first member at least partially around the elongated member when the second member is under the second compression of the second value; and
    applying a third compression on the second member, said third compression being of the predetermined value, thereby causing an elastic deformation of the second member.

16. The method of claim 14 further comprising the steps of:

removing the second compression from the second member;

applying a third compression on the second member, said third compression being of a second value that is less than the predetermined value;

rotating the first member at least partially around the elongated member when the second member is under the third compression; and applying a fourth compression on the second member, said fourth compression being of the predetermined value, thereby causing an elastic deformation of the second member.

17. The method of claim 14 wherein the second member is constructed of nitinol.

18. The method of claim 14 wherein the first and second members are rings and wherein the elongated member is one of a bolt and an externally-threaded stud.

19. An apparatus for use with a first member and for use in indicating a first compression of a predetermined value exerted on a surface and a second compression of the predetermined value exerted on the surface, said first member having a first member inner surface defining a first member aperture, wherein said first member is adapted to mate with an elongated member extending from the surface and to at least partially rotate around the elongated member, said apparatus comprising:

means for repeatedly inhibiting the at least partial rotation of the first member around the elongated member when an amount of compression exerted on the surface is equal to the predetermined value, wherein said inhibiting means includes a second member adapted to mate with the elongated member and constructed of a material that is adapted to deform elastically when compressed by an amount equal to the predetermined value, and wherein the apparatus reusable for indicating the second compression of the predetermined value.

* * * * *